US009739576B1

(12) United States Patent
Venigalla

(10) Patent No.: US 9,739,576 B1
(45) Date of Patent: Aug. 22, 2017

(54) PORTABLE TARGET GAME WITH COLLECTING UNIT

(71) Applicant: Verily Products Group LLC, Glen Head, NY (US)

(72) Inventor: Rajendraprasad Venigalla, Glen Head, NY (US)

( * ) Notice: Subject to any disclaimer, the term of this patent is extended or adjusted under 35 U.S.C. 154(b) by 0 days.

(21) Appl. No.: 15/280,397

(22) Filed: Sep. 29, 2016

Related U.S. Application Data

(60) Provisional application No. 62/234,075, filed on Sep. 29, 2015.

(51) Int. Cl.
| | |
|---|---|
| F41J 9/00 | (2006.01) |
| F41J 5/056 | (2006.01) |
| A63B 67/06 | (2006.01) |
| F41J 1/10 | (2006.01) |
| F41J 3/00 | (2006.01) |
| F41J 3/02 | (2006.01) |
| F41J 9/02 | (2006.01) |
| A63B 71/02 | (2006.01) |
| F41J 5/052 | (2006.01) |
| F41J 5/14 | (2006.01) |
| F41J 5/24 | (2006.01) |
| A63F 13/837 | (2014.01) |
| A63F 13/218 | (2014.01) |
| A63F 13/60 | (2014.01) |

(52) U.S. Cl.
CPC .............. *F41J 5/056* (2013.01); *A63B 67/06* (2013.01); *A63B 71/022* (2013.01); *A63F 13/218* (2014.09); *A63F 13/60* (2014.09); *A63F 13/837* (2014.09); *F41J 1/10* (2013.01); *F41J 3/0004* (2013.01); *F41J 3/02* (2013.01); *F41J 5/052* (2013.01); *F41J 5/14* (2013.01); *F41J 5/24* (2013.01); *F41J 9/02* (2013.01); *A63F 2300/204* (2013.01); *A63F 2300/408* (2013.01); *A63F 2300/8076* (2013.01); *F41J 9/00* (2013.01)

(58) Field of Classification Search
CPC .. A63B 63/06; A63F 9/0243; F41J 9/00; F41J 9/02; F41J 7/06; F41J 1/10
USPC .......................... 273/359, 366–377, 403–410
See application file for complete search history.

(56) References Cited

U.S. PATENT DOCUMENTS

| | | | | |
|---|---|---|---|---|
| 626,500 | A | * | 6/1899 | McCullough .............. A63F 9/02 273/348 |
| 1,348,283 | A | * | 8/1920 | Koehl .................... A63F 9/0243 273/368 |
| 1,507,296 | A | * | 9/1924 | Newman .................... A63F 9/02 273/357 |
| 3,112,109 | A | * | 11/1963 | Young .................... A63B 65/12 124/26 |
| 3,552,749 | A | * | 1/1971 | Piggotte ............. A63B 69/0071 273/368 |
| 3,814,429 | A | * | 6/1974 | Lienhard ................ A63B 63/06 273/127 D |

(Continued)

*Primary Examiner* — Mark Graham
(74) *Attorney, Agent, or Firm* — Chan Hubbard PLLC

(57) ABSTRACT

A portable target game that can be set up and played anywhere. The game consists of moving targets within a concave backstop, the moving targets being attached to flexible rods such that hits on target fall into the base of the concave backstop. The game is meant to be played with existing, lightweight projectiles such as NERF guns and plastic balls. The concave backstop is foldable such that the game can be folded up with all of the projectiles inside, and disassembled for convenient storage.

3 Claims, 3 Drawing Sheets

(56) References Cited

U.S. PATENT DOCUMENTS

| | | | | |
|---|---|---|---|---|
| 4,583,743 A | * | 4/1986 | Macek | F41B 3/03 |
| | | | | 124/4 |
| 5,358,254 A | * | 10/1994 | Yeh | F41J 9/02 |
| | | | | 273/366 |
| 5,496,039 A | * | 3/1996 | Zammuto | F41J 3/0023 |
| | | | | 273/368 |
| 5,890,985 A | * | 4/1999 | Jenney | A63B 69/0071 |
| | | | | 473/447 |
| 6,168,160 B1 | * | 1/2001 | DeOreo | A63F 9/02 |
| | | | | 273/336 |
| 2004/0169334 A1 | * | 9/2004 | Martin | F41J 3/0076 |
| | | | | 273/371 |
| 2007/0284825 A1 | * | 12/2007 | Blagg | A63F 9/0243 |
| | | | | 273/359 |
| 2008/0164657 A1 | * | 7/2008 | Sheldon | F41J 7/06 |
| | | | | 273/368 |

* cited by examiner

PORTABLE TARGET GAME WITH COLLECTING UNIT

FIELD OF THE INVENTION

The invention lies in the field of toys and games.

BACKGROUND

Target games are a popular pastime that have evolved from simple target practice, to game booths at arcades and fairs featuring moving targets, to electronic games playable at home on electronic gaming consoles. Ammunition has evolved alongside, beginning with the bow and arrow, to balls and water guns, play artillery, to electronic gaming laser guns.

The most basic target games' difficulty is determined by their distance from the user and the visibility of the target. Other target games use moving targets to increase the difficulty. Many moving target games are placed at arcades, carnivals, or outdoors, and are large and not portable. Similarly, old arcade games would usually stay in one place for their lifetime. Electronic games rely on game consoles and screens, such as the user's TV.

Projectiles such as arrows that lodge in the target need to be dislodged for reusing. Many play ammunitions bounce off the target or scatter around when the target is missed. Projectiles that bounce off of the target may bounce and scatter over the ground around the game.

SUMMARY

Disclosed is a unique target game that is portable, comprising foldable and lightweight parts that can be assembled and set up anywhere, and a design that facilitates easy cleanup and re-play by incorporating a flexible backstop and collection pouch. The game is designed with a convenient backstop that collects fallen projectiles for quick cleanup and re-play. Kids can set up the game anywhere in their backyard, and afterwards, easily store the game and projectiles.

The game comprises one or more moving targets and electronic sensing of hits, and can be played with existing lightweight projectiles. By incorporating an electronic microprocessor that also controls the target movement, the game facilitates variable, exciting and challenging game play.

DETAILED DESCRIPTION

Figure 1:
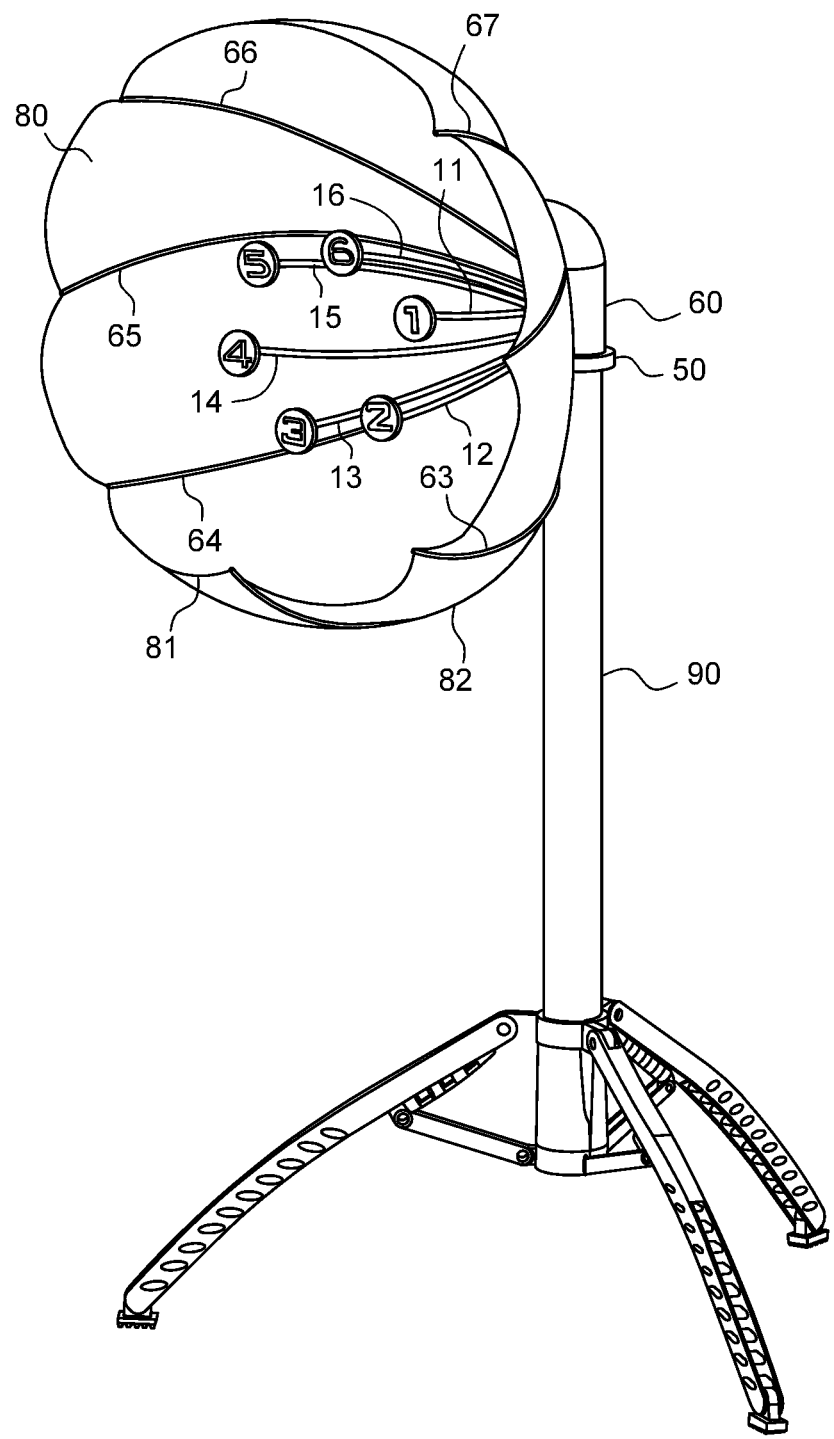
FIG. 1 is a right perspective view of the game.
Figure 2:
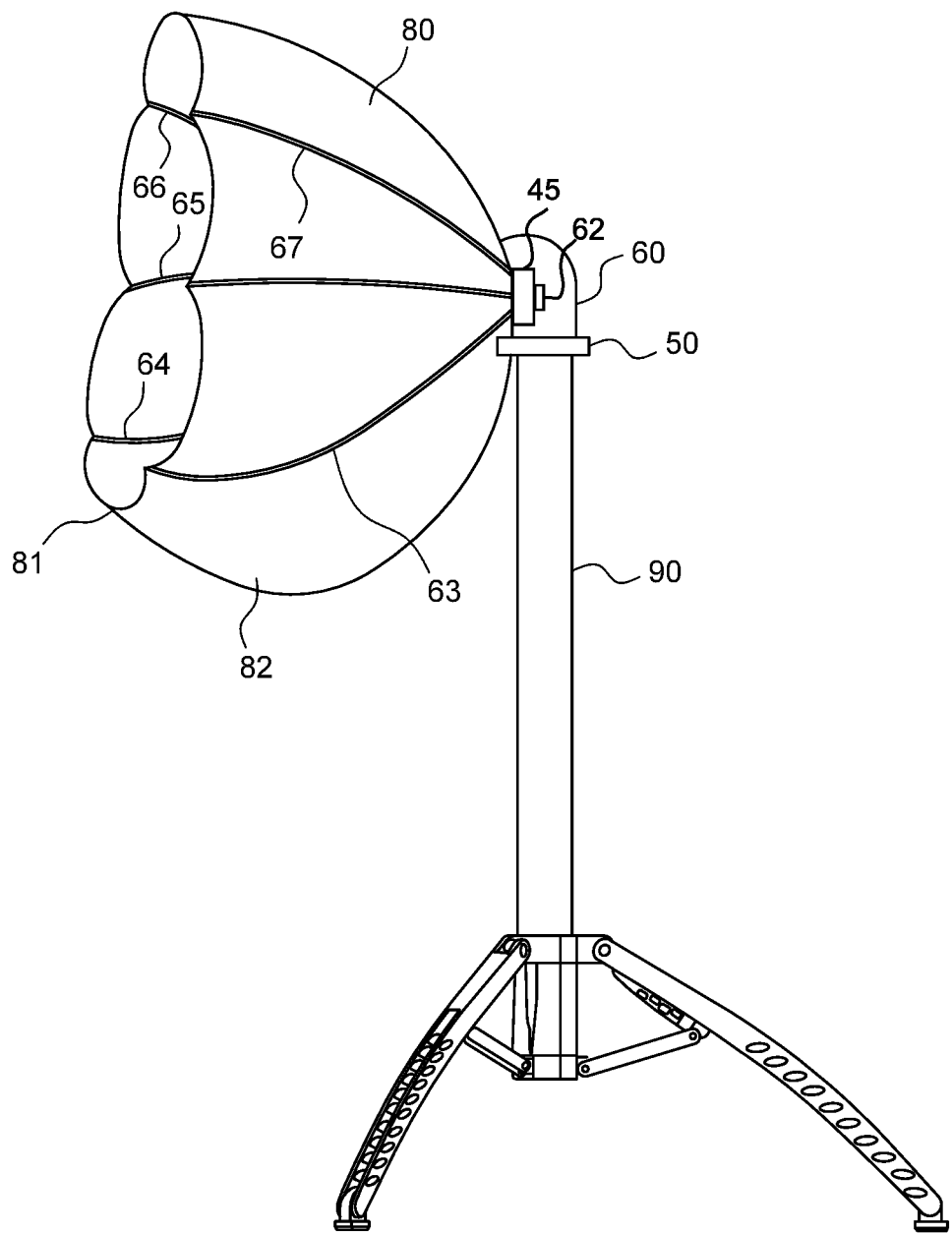
FIG. 2 is a right side view of the game.

As shown in FIGS. 1 and 2, the target device comprises one or more moving targets 1 through 6, portable stand 90, and foldable backstop 80. The game is easily storable by closing up the backstop and folding the portable stand, and easy to set up anywhere by expanding the backstop and setting up the stand. The game can be played with existing projectiles such as lightweight balls or foam arrows, and existing play launchers such as NERF guns, ball guns, and bow and arrow sets. Kids can set up the game anywhere in their backyard, and afterwards, easily store the game and projectiles.

Foldable backstop 80 is a concave apparatus approximately 36 to 48 inches in diameter. It is comprised of a lightweight material such as nylon, canvas, linen, plastic, polyester, or any other flexible material. Furthermore, it is constructed so as to form a collection pouch 82 into which projectiles will fall when they are on target or within the radius of the backstop. Because the backstop material is flexible, projectiles generally on target will not bounce out of the backstop and instead will fall into collection pouch 82. Adding to the playful nature of the game, the foldable backstop is preferably decorative and/or includes decorative trim, such as LED lighting.

The foldable backstop comprises a set of radial ribs (such as 63, 64, 65, 66, 67) that form the shape of the backstop and are foldable to open and close the foldable backstop. For instance, the ribs may be arced to form an umbrella-shaped backstop. The flexible material forming the backstop may be attached to the lowest arcs in such a manner as to cause the material to hang loosely and thereby form the collection pouch.

The one or more targets are movable by any mechanism that would be available to one of ordinary skill in the art. In a first embodiment the targets are coupled to a motorized, rotating base. In the example shown in FIG. 1, the motorized base 45 is within backstop base 60, and targets 1 through 6 are coupled to base 60 by flexible rods 11 through 16. The flexibility of the rods allows them to absorb impact when a projectile makes an accurate target hit, causing the projectile to drop to the base of the backstop collecting unit rather than bouncing away from the game.

Figure 3A:
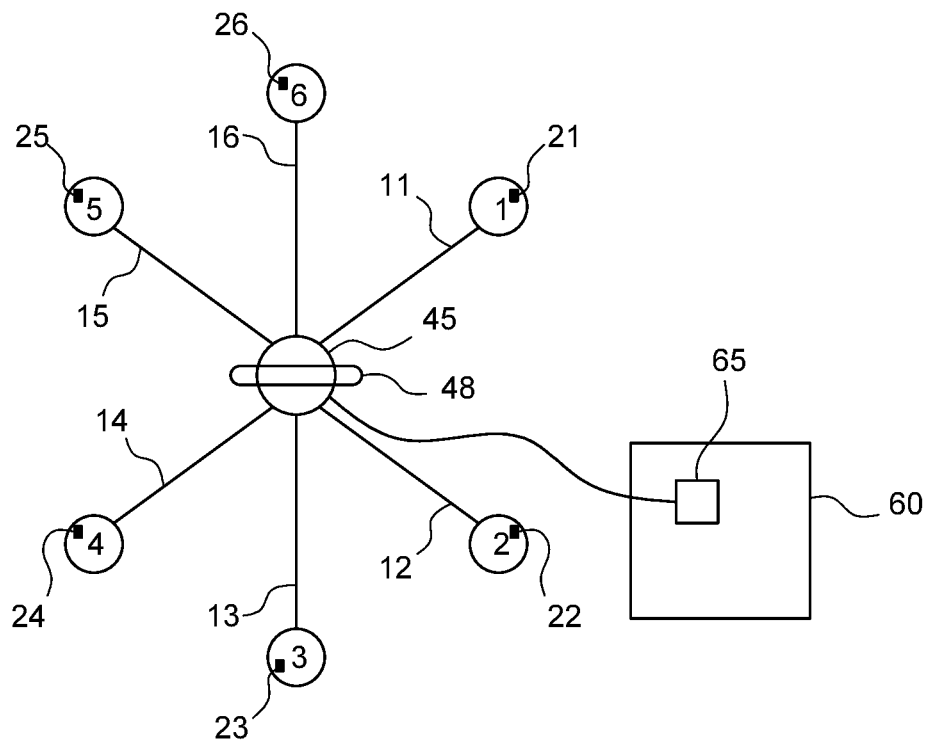
FIG. 3A is a front, partial view showing a rotating base.
Figure 3B:
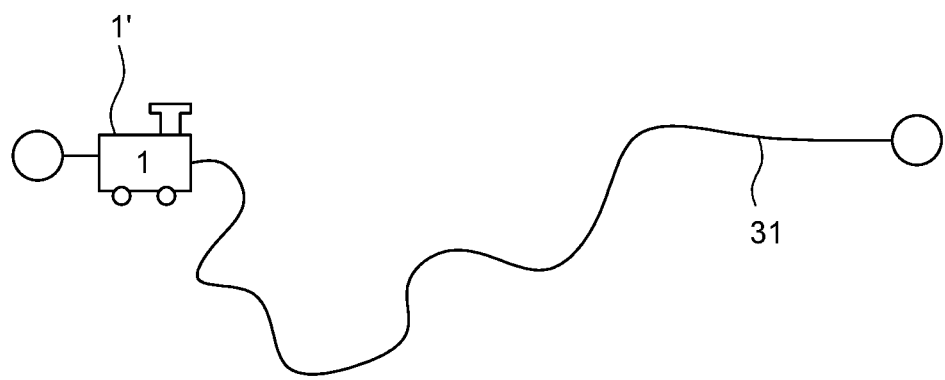
FIG. 3B is a front, partial view showing a variable path.

In order to increase the fun and challenge of the game, the targets are movable in diverse paths and at different speeds. For instance, as shown in FIG. 3A, the motorized base may be a rotating base 45, and may also comprise a cam 48 to change the path of the targets as the flexible rods 11 through 16 are rotated by the motorized base 45. As they rotate around the base with cam, the result is that the targets move towards and away from the user. In another example shown in FIG. 3B, target 1' is mounted on a track 31 to move in any path made by the track. Track 31 may be customizable, such as by being comprised of a flexible wire. Other variations in game play include, but are not limited to, targets that bounce and swing, targets that change size and/or color, targets in different shapes, and glow in the dark targets. Multi-player games may be implemented using different color targets. For example, a first player aims for red colored targets and a second player aims for green. The user may select the variables pertaining to the targets before beginning game play.

One or more electronic sensors are coupled to the one or more targets to detect target hits. For instance, as shown in FIG. 3A, piezoelectric sensors 21 through 26 are each coupled to the targets 1 through 6, such that a signal is sent to an integrated circuit 62 when a target is hit. The invention can be implemented with any sensor that measures a small force, such as a piezoelectric sensor, a vibration sensor, etc. . . . . Hit data can be sent wirelessly to an application such as software on a smartphone, or it may be displayed on an electronic scoreboard coupled to the game itself. The game may also comprise at least one speaker and/or LEDs that play sounds and/or light up when the user achieves target hits.

Backstop 60 comprises integrated circuit 62 for receiving sensor information and, in some embodiments, for implementing variability in game play. For instance, the microprocessor 62 coupled to motor 61 implements user control over target speed, direction, and any other attributes that are programmable by one of ordinary skill. The microprocessor may also comprise a wireless or Bluetooth controller for sending and receiving data from a remote application such as a smartphone. Thus, user control may be enabled through an interface on the game itself, or can also be implemented on a user receiver such as a smartphone. This allows for the recordation of game play information such that the user can track their improvement over time, or play in a networked environment to compare to peers' ability. The device may be powered by batteries, rechargeable batteries, rechargeable lithium battery pack, or AC/DC electrical power.

The game can further comprise a portable stand 90, allowing the game to be set up and played virtually anywhere. Portable stand 90 may be any stand such as an exemplary tripod stand depicted, and it may be adjustable for height and foldable for portability. The foldable backstop is attachable to a stand by means of a backstop base 60 connectable to stand receiver 50. Stand receiver 50 may be any type of receiver, such as threaded, slide, pin or bayonet lock, etc. . . . . The one or more targets, motor 61, and microprocessor 62 may all be located in backstop base 60. Thus, the backstop base can be used to attach the game anywhere. For instance, using available mechanical adaptors, the game can be hung from a door or wall.

In another embodiment, the game further comprises an electronic version implemented in software. The electronic version of the game is an interactive graphical depiction of the game heretofore described. The electronic version of the game may be implemented in any software for any platform or device, including, but not limited to, videogame consoles, computer software, web applications, and smartphone applications. First, a user may select player customization variables such as male or female player, avatar, clothing, or may select a pre-selected or saved customized player etc. . . . . Second, the user may select game customization variables such as type of projectile (NERF arrows, bow and arrow, softball, etc. . . . ); number, size, shape and colors of targets; and target, speed, direction and path. Game customization data may be saved for re-selection at a later time, or it may be presented in pre-selected levels of difficulty. Once player and game customization variables have been transmitted, an onscreen game is presented for the user to play. Target hits may be implemented by any method, including through the use of a touch-sensitive screen. The electronic game may have any variation in game play, such as timed games, progressively increasing difficulty, multi-player options, etc. . . . . The electronic game may also be capable of sending and receiving data from other sources on the device as well as the internet, such that data including player and game customization may be stored and retrieved from a separate location or server, and game invites can be sent and received from the user's local and social media contacts for multi-player game play.

What is claimed is:

1. A target game comprising:
   one or more movable targets on flexible rods;
   a motor for moving the one or more movable targets on flexible rods;
   a microprocessor programmable to detect hits on the one or more movable targets and to control one or more attributes of the one or more movable targets; and
   a foldable backstop for collecting projectiles and comprising a collection pouch, wherein the foldable backstop is a concave apparatus such that the one or more movable targets do not extend beyond the edge of the concave apparatus and wherein the foldable backstop further comprises:
   a central vertex;
   a set of radial ribs, attached to and extending from the central vertex; and
   a flexible fabric attached to each radial rib to accommodate the folding of each radial rib.

2. The target game of claim 1 further comprising a stand receiver to which the motor, microprocessor and foldable backstop are attached, and a portable stand attachable to the stand receiver.

3. The target game of claim 2 wherein the one or more attributes of the one or more movable targets includes speed and/or direction.

* * * * *